US012763110B2

(12) United States Patent

Jimbo et al.

(10) Patent No.: US 12,763,110 B2

(45) Date of Patent: Oct. 13, 2026

(54) MAGNETIC DISC DEVICE

(71) Applicants: Kabushiki Kaisha Toshiba, Tokyo (JP); Toshiba Electronic Devices & Storage Corporation, Tokyo (JP)

(72) Inventors: Tomohiko Jimbo, Fujisawa (JP); Biswas Debasish, Shiki (JP); Makoto Okamoto, Kodaira (JP)

(73) Assignees: Kabushiki Kaisha Toshiba, Tokyo (JP); Toshiba Electronic Devices & Storage Corporation, Tokyo (JP)

(*) Notice: Subject to any disclaimer, the term of this patent is extended or adjusted under 35 U.S.C. 154(b) by 0 days.

(21) Appl. No.: 19/234,565

(22) Filed: Jun. 11, 2025

(65) Prior Publication Data

US 2026/0073950 A1 Mar. 12, 2026

(30) Foreign Application Priority Data

Sep. 12, 2024 (JP) ................................ 2024-158631

(51) Int. Cl.
*G11B 33/14* (2006.01)
*G11B 5/55* (2006.01)

(52) U.S. Cl.
CPC .......... *G11B 33/148* (2013.01); *G11B 5/5521* (2013.01)

(58) Field of Classification Search
CPC ..... G11B 5/48; G11B 33/1466; G11B 33/148; G11B 5/4833; G11B 5/6005; G11B 5/54; G11B 5/5582; G11B 5/483; G11B 33/08
USPC ......... 360/97.13, 97.01, 97.03, 97.08, 256.1, 360/256.297, 2
See application file for complete search history.

(56) References Cited

U.S. PATENT DOCUMENTS

| | | | | |
|---|---|---|---|---|
| 7,119,992 | B2 * | 10/2006 | Miyamoto | G11B 5/54 |
| 7,262,934 | B2 * | 8/2007 | Adams | G11B 33/148<br>360/97.16 |
| 7,405,902 | B2 * | 7/2008 | Sorrell | G11B 5/6005<br>360/97.2 |
| 7,929,246 | B2 * | 4/2011 | Takemori | G11B 25/043<br>360/97.13 |
| 7,944,644 | B2 * | 5/2011 | Kaneko | G11B 25/043<br>360/97.13 |
| 9,196,312 | B2 * | 11/2015 | Mizumoto | G11B 33/148 |
| 2008/0043369 | A1 | 2/2008 | Takemori et al. | |
| 2010/0142081 | A1 | 6/2010 | Funabashi et al. | |
| 2014/0111883 | A1 | 4/2014 | Eguchi et al. | |
| 2025/0095685 | A1 | 3/2025 | Jimbo et al. | |

FOREIGN PATENT DOCUMENTS

| | | | |
|---|---|---|---|
| JP | 2007-323788 | A | 12/2007 |
| JP | 2010-135002 | A | 6/2010 |
| JP | WO 2012/169048 | A1 | 12/2012 |
| JP | 2014-10844 | A | 1/2014 |
| JP | 2025-44406 | A | 4/2025 |

* cited by examiner

*Primary Examiner* — Nabil Z Hindi

(74) *Attorney, Agent, or Firm* — Oblon, McClelland, Maier & Neustadt, L.L.P.

(57) ABSTRACT

According to one embodiment, a magnetic disk device of an embodiment includes a rotary shaft, a shroud, and a damper. The rotary shaft rotates the plurality of disks. The shroud surrounds at least a part of the disk along the outer edge of the disk with a space from the outer edge of the disk. The damper is provided on a downstream side of the shroud with respect to a flow between the disks induced by rotation of the disks, and the damper has a portion intersecting with the flow and a portion along the flow.

8 Claims, 6 Drawing Sheets

MAGNETIC DISC DEVICE

CROSS-REFERENCE TO RELATED APPLICATION(S)

This application is based upon and claims the benefit of priority from Japanese Patent Application No. 2024-158631, filed Sep. 12, 2024, the entire contents of which are incorporated herein by reference.

FIELD

Embodiments of the present invention relate to a magnetic disk device.

BACKGROUND

As the recording density of a magnetic disk increases, it is necessary to position a magnetic head with high accuracy. When the magnetic disk rotates at a high speed, the speed of the gas flow inside the device increases, and the turbulence also increases. When the flow is fast and the turbulence is large, the force received by the arm supporting the magnetic head increases or the arm vibrates, which is a factor of causing a decrease in positioning accuracy. Particles such as dust in the magnetic disk drive adhere to the disk surface, damaging the disk surface or causing data read/write errors.

Therefore, a magnetic disk device is required which achieves both suppression of a decrease in the positioning accuracy of the magnetic head due to the flow and reduction of the amount of particles adhering to the disk.

DETAILED DESCRIPTION

Figure 1:
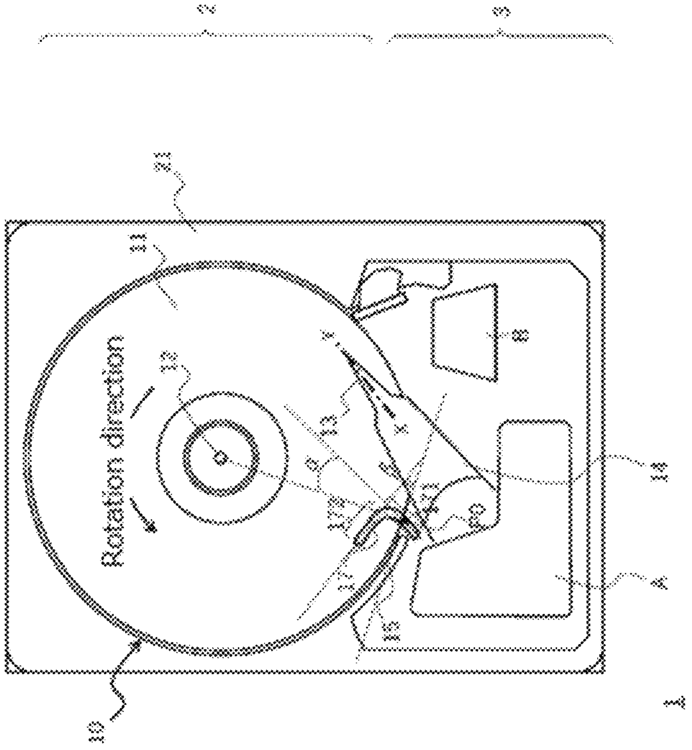
FIG. 1 is a schematic view of the inside of a magnetic disk device according to a first embodiment.

In general, according to one embodiment, a magnetic disk device of an embodiment includes a rotary shaft, a shroud, and a damper. The rotary shaft rotates the plurality of disks. The shroud surrounds at least a part of the disk along the outer edge of the disk with a space from the outer edge of the disk. The damper is provided on a downstream side of the shroud with respect to a flow between the disks induced by rotation of the disks, and the damper has a portion intersecting with the flow and a portion along the flow.

Hereinafter, embodiments for carrying out the invention will be described. The configurations and controls of the embodiments and modifications described below, and the operations and effects brought about by the configurations and controls are merely examples. Further, the embodiments exemplified below include the same components. Hereinafter, the same components are denoted by the same reference numerals, and the overlapping description will be omitted.

First Embodiment

FIG. 1 is a schematic diagram of the inside of a magnetic disk device 1 according to the present embodiment. The magnetic disk device 1 includes a casing 21. The casing 21 is filled with a medium gas such as air, helium, mixed gases, and the like. In the casing 21, one or more disks 11 which are magnetic disks of storage media, a shroud 10 surrounding the disks 11, a rotary shaft 12, a magnetic head 13 for recording or reproducing information of the storage media, an arm 14 supporting the magnetic head 13, a guide vane 15, a damper 17, and an actuator for controlling the position of the magnetic head are provided. The plurality of disks 11 rotate about a rotary shaft 12. The inside of the casing 21 is divided into a disk-side region 2 in which the disk 11 is housed and an equipment-side region 3 in which the magnetic head 13, the arm 14, the actuator, and the like are housed. FIG. 1 illustrates a state in which the disks 11 rotate counterclockwise about the rotary shaft 12, and the magnetic heads 13 are positioned on the surfaces of the disks 11 and between the disks 11 to read and write data.

A shroud 10 is provided in the casing 21 to surround at least a part of the disk 11 along the outer edge of the disk 11 with a space from the outer edge of the disk 11. In the region where the shroud 10 is along the disk 11, the interval between the shroud 10 and the disk 11 is preferably 0.1 mm or more and 1.0 mm or less.

The disk 11 is a disc-shaped storage medium, and a plurality of disks are stacked. The number of disks 11 can be changed according to the specification. The disk 11 may be of a type having a single-sided magnetic layer or a double-sided magnetic layer, but in the present embodiment, the disk 11 is described as a double-sided type. The plurality of disks 11 are provided rotatably in a rotation direction by a rotary shaft and are stacked at predetermined intervals in the axis direction of the rotary shaft. In the present specification, the main surface of the disk 11 is referred to as a "disk surface", and the disk surface may be described as including the front surface and the rear surface of the disk 11.

The rotary shaft 12 is a shaft for rotating the disk 11. The rotary shaft 12 is connected to a drive motor (not shown), and the disk 11 fixed to the rotary shaft 12 and rotatably disposed is rotated about the rotary shaft 12 as a central axis. The rotation speed of the disk 11 by driving the rotary shaft 12 is generally several thousands rpm to several tens of thousands rpm, but the rotation speed of the disk 11 in the present embodiment is not limited to this range. In the present embodiment, the counterclockwise direction in FIG. 1 is described as the rotation direction of the disk 11.

Figure 2:
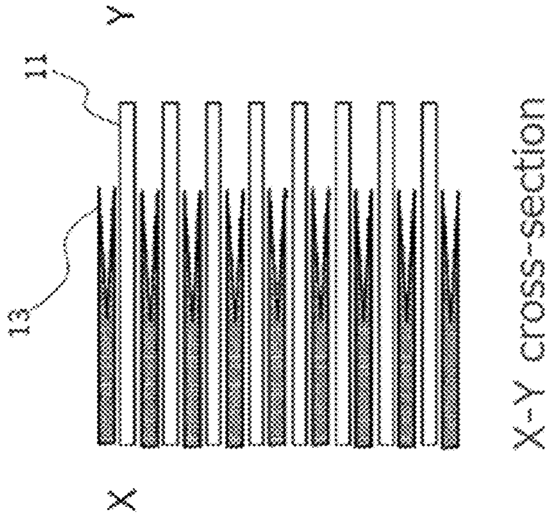
FIG. 2 is a cross-sectional view taken along line X-Y in FIG. 1.
Figure 3:
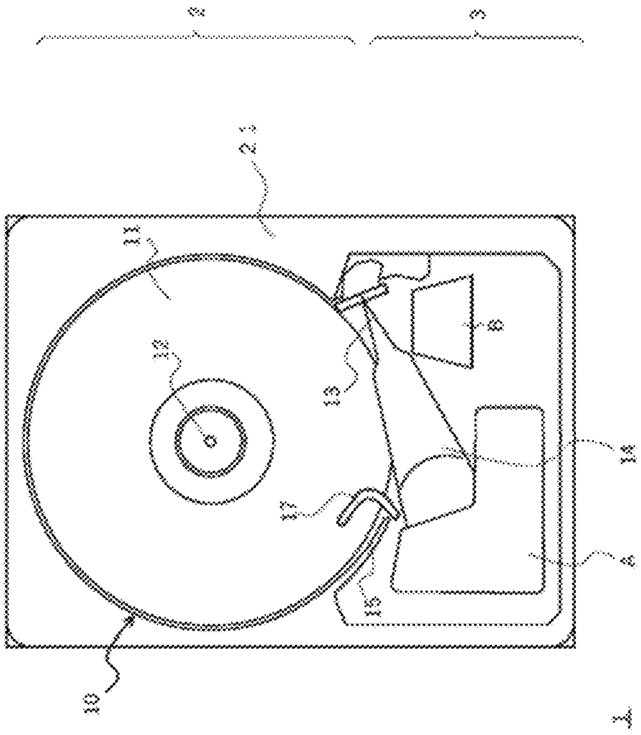
FIG. 3 is an example of a schematic diagram of a magnetic disk device when a disk is stopped.

The magnetic head 13 reads data recorded on the disk 11 and writes data to the disk 11. The magnetic head 13 is provided at the tip of the arm 14. FIG. 2 is a cross-sectional view taken along line X-Y in FIG. 1. The magnetic heads 13 and the disks 11 are alternately arranged. The magnetic head 13 positioned above the disk 11 can read and write (hereinafter referred to as read and write) the upper surface (front surface) of the disk 11, the magnetic head 13 positioned between the disks 11 can read and write the lower surface (rear surface) of the disk 11 positioned above the magnetic head 13 and read and write the front surface of the disk 11 positioned below the magnetic head 13, and the magnetic head 13 positioned below the disks 11 can read and write the rear surface of the disk 11 positioned above the magnetic head 13. FIG. 3 is an example of a schematic diagram of the magnetic disk device when the disk 11 is stopped. When the disk 11 stops rotating, the magnetic heads 13 and the arms 14 are retracted from the disk 11 as shown in FIG. 3. When the rotary shaft 12 is rotated and the disks 11 are rotated, the magnetic heads 13 are floated from the surfaces of the disks 11 by a predetermined amount (for example, about a 10 nm) by gas flow generated in the rotating direction of the disks 11 by the centrifugal force and surface viscosity. By controlling the position of the arm 14 with the actuator, data is read from and written to the magnetic layer of the disk 11 at the portion opposing the magnetic head 13. The disk 11 opposed by the magnetic head 13 corresponds to the disk 11 immediately above the magnetic head 13 and the disk 11 immediately below the magnetic head 13. That is, the magnetic head 13 reads and writes information from and to the disk 11 opposed thereto.

The arm 14 is a member for supporting the magnetic head 13. The magnetic head 13 provided at the tip of the arm 14 is arranged so as to be able to enter the gap in the stacking direction of the disks 11.

The actuator controls the driving of the arm 14 and controls the position of the magnetic head 13 with respect to the disk 11. The actuator is included in the devices A in FIG. 1. Examples of the actuator include a voice coil motor and a stepper motor, but the actuator in the present embodiment is not limited thereto.

The guide vane 15 is disposed between the disk-side region 2 and the equipment-side region 3 so as to be substantially along the disk 11 and extends from the end of the shroud 10 on the downstream side of the flow 101 generated in the rotational direction of the disk 11 to the front of the damper 17. That is, the guide vane 15 is provided between the damper 17 and the end portion of the shroud 10 on the downstream side of the flow between the disk 11 and the shroud 10 induced by the rotation of the disk 11 so as to be substantially along the disk 11, and one end of the guide vane 15 is connected to the end portion of the shroud 10 on the downstream side of the flow. Here, the expression "substantially along" is used because the interval between the guide vane 15 and the disk 11 is not completely constant and may vary depending on the position.

As shown in FIG. 1, a damper 17 is provided in the vicinity of the base of the arm 14 and on the upstream side of the arm 14 with respect to the gas flow between the disks 11 induced by the rotation of the disks 11. Here, the "gas flow between the disks 11 induced by the rotation of the disks 11" is a gas flow in the counterclockwise direction in the drawing about the rotary shaft 12, and in the vicinity of the damper 17, the gas flow flows with the damper 17 side as the upstream and the arm 14 side as the downstream. The damper 17 is located downstream of the shroud 10 with respect to the flow between the disks 11 induced by the rotation of the disks 11. The damper 17 has a comb-like structure inserted between the disks 11, like the arm 14. The damper 17 has a portion intersecting with a flow between the disks 11 induced by the rotation of the disks 11 and a portion along the flow. The damper 17 has a substantially L-shape in which a portion (first portion: 171) extending in a direction from the outer edge of the disk 11 toward the center and a portion (second portion: 172) extending in a direction opposite to the rotation direction of the disk 11 are connected in a curved manner. In other words, the first portion 171 and the second portion 172 are smoothly continuous and have no corner. As the first portion 171 is longer, the flow **101*d* that can be decelerated increases, but there is a concern that difficulty may occur in securing strength or manufacturing. Therefore, although the length of the first portion 171 is not limited in theory to obtain the effect of the present invention, it is preferable that the length of the first portion 171 is actually about ⅔ or less of the radius of the disk 11. The length of the second portion 172 is not particularly limited, but similarly to the length of the first portion 171, if the length is too long, it is assumed to be difficult in practice, and therefore, the length of the second portion 172 is preferably about ½ to 3/2 of the length of the first portion 171. The first portion 171 extends in a direction toward the rotary shaft 12. In particular, an angle α formed by a straight line connecting a portion P0 (indicated by a star shape in the figure) where the first portion 171 and the outer edge of the disk 11 intersect with each other and the rotary shaft 12 and the first portion 171 is preferably 0° or more and 30° or less, and more preferably 0° or more and 10° or less. In the second portion 172, an angle β formed by a tangent line of the disk 11 at the P0 and the second portion 172 is preferably 0° or more and 30° or less, and more preferably 0° or more and 10° or less. The first portion 171 and the second portion 172** are preferably connected via a curved line. This is because the curved connection can prevent the generation of a turbulent gas flow due to a separation vortex.

Figure 4:
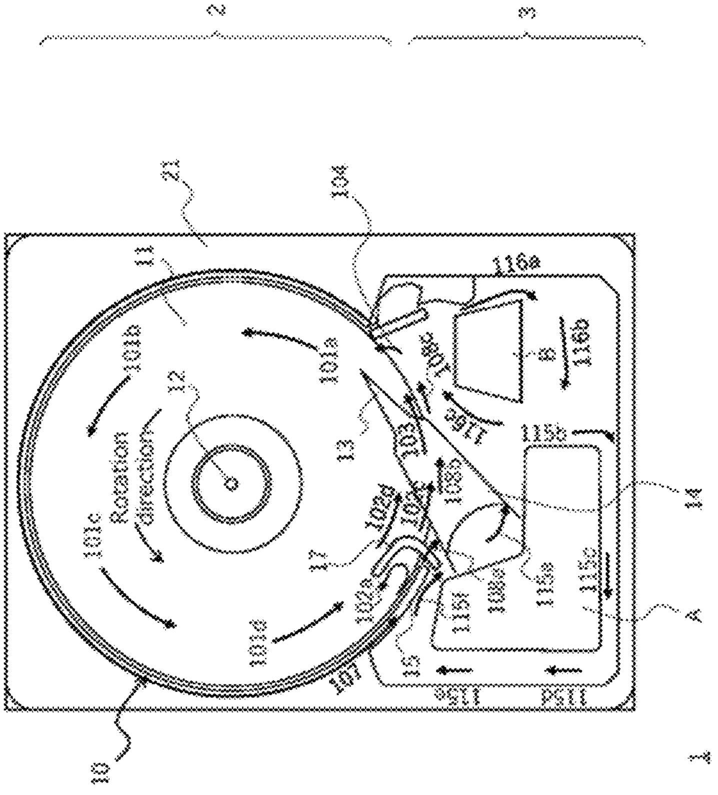
FIG. 4 is a schematic view of the schematic diagram of FIG. 1 with the flow of gas flow indicated by arrows.

The gas flow generated inside the magnetic disk device 1 will be described below with reference to FIG. 4. The thick arrows in the figure indicate the direction of the gas flow in the magnetic disk device 1. The position and shape of the thick arrow are drawn for convenience of description, and the length and thickness of the thick arrow do not quantitatively indicate the flow velocity or flow rate of the gas flow. The rotation of the disk 11 induces a gas flow, and flows **101*a* to 101*d* are generated near the front face of the disk 11. In the present specification, the flows 101*a* to 101*d* may be collectively referred to as the flow 101**.

The gas flow generated inside the magnetic disk device 1 will be described below. The rotation of the disk 11 induces a gas flow, and the flow 101 including flows **101*a* to 101*d* is generated in the disk-side region 2 near the front side of the disk 11. In the present embodiment, attention is also paid to the flow 107 that is induced by the rotation of the disk 11 and passes through the gap between the disk 11 and the shroud 10. In the figure, the arrow indicating the flow 107 is drawn outside the shroud 10 for the sake of visibility, but actually correspond to the gas flow flowing through the gap between the shroud 10 and the disk 11. A part of the flow 101*d* is decelerated by the damper 17. A part of the flow of the flow 101*d* is mainly blocked by the first portion 171 of the damper 17, and the flow 102*a* circulating inside the damper 17 is generated. A part of the flow 102*a* becomes 102*c* flowing to the downstream side of the damper 17. A part of the flow 101*d* that is not blocked by the damper 17 is rectified mainly by the second portion 172 of the damper 17 to become the flow 102*d*. Since the flow 102*d* is rectified by the damper 17, the flow along the rotation direction of the disk 11** becomes less turbulent.

The flow **102*c* is a gas flow after passing through the space between the guide vane 15 and the second portion of the damper 17 and is decelerated by the damper 17**.

The flow 107 in the gap between the shroud 10 and the disk 11 is guided by the guide vane 15 so as to pass through the gap of the first portion 171 of the damper 17, is decelerated when passing through the damper 17 (flow **108*a*), and then flows in the vicinity of the boundary between the disk-side region 2 and the device-side region 3 as 108*b* and 108*c***.

In the device-side region 3, there is a gas flow in addition to the flow **108*a* to 108*c*. For example, the flows 115*a* to 115*f* flowing so as to surround the devices A, the flows 116*a* to 116*c* flowing so as to surround the devices B, and the like. In the figure, a case where the flows 115*a* to 115*f* and the flows 116*a* to 116*c*** flow clockwise about the devices A is shown, but the direction of the flow that actually occurs depends on the shapes and arrangement of the devices A and B, and therefore is not limited to the direction shown in the figure.

Figure 5:
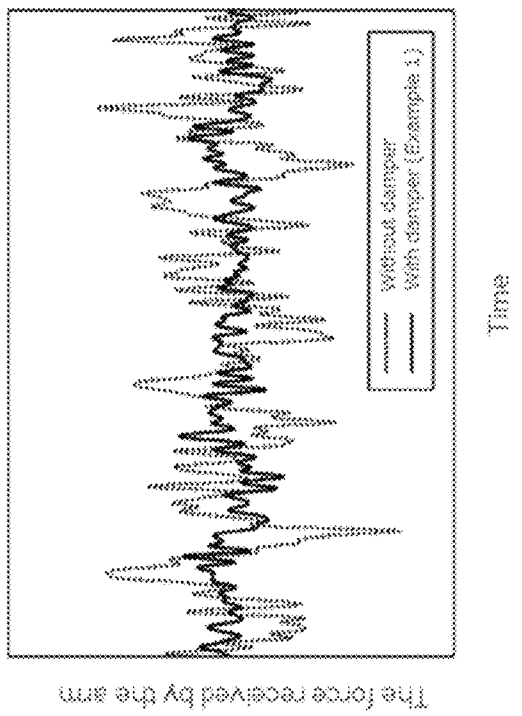
FIG. 5 is a graph showing a change over time in force received by an arm due to a gas flow.

In the present embodiment, the arm 14 receives the flows 102*c* to 102*d*, 103 and the flow 108*a* to 108*b*. However, in the present embodiment, as described above, the flow 102*d* is rectified by the damper 17 and thus is less disturbed, and the flow 102*c* and the flows 108*a* to 108*c* are decelerated by the damper 17 and thus the influence of these gas flows on the arm 14 is reduced and the vibration of the magnetic heads 13 is suppressed. FIG. 5 shows a change in force applied to the arm 14 by the gas flow with time. The vibration of the magnetic head 13 in the case where the damper 17 is provided in the magnetic disk device 1 (corresponding to the state of FIG. 1) is shown by a solid line, and the vibration of the magnetic head 13 in the case where the damper 17 is not provided in the magnetic disk device 1 is shown by a dotted line. When the solid line and the dotted line are compared, it is understood that the vibration of the magnetic head 13 is greatly reduced by providing the damper 17.

Further, the flow 102*d* with less turbulence rectified by the damper 17, the flow 102*c* decelerated by the damper 17, and the flow 108*a* to 108*c* reduce the difference in pressures between the disk-side region 2 and the device-side region 3, and the amount of particles flowing from the device-side region 3 into the disk-side region 2 can be reduced.

Furthermore, in the present embodiment, the flow from the disk-side region 2 toward the device-side region 3 is further reduced by the guide vanes 15. Therefore, the flow 104 returning from the device-side region 3 to the disk-side region 2 is also reduced, and accordingly, the inflow of particles from the device-side region 3 to the disk-side region 2 is reduced, and the amount of particles adhering to the surface of the disk 11 is reduced.

As described above, according to the present embodiment, the damper 17 decelerates the flow and reduces turbulence, thereby reducing the forces applied to the arms 14 and the magnetic heads 13 from the flows 102*c*, 102*d*, and 103 and the vibrations caused by the flows. As a result, the vibration of the arm 14 due to the flow is reduced, and thus the positioning accuracy of the magnetic head 13 by the actuator can be improved, or the positioning can be easily performed. In addition, in the related art, there is a problem in that the flow that has passed through the device-side region 3 flows into the disk-side region 2 again while carrying particles having a particle diameter of approximately several tens nm to several hundreds nm that are present in the device-side region 3. If the particles carried to the disk-side region 2 adhere to the surface of the disk 11, the disk surface may be damaged or data read/write errors may occur. However, according to the present embodiment, the damper 17 decelerates and rectifies the flow downstream of the damper 17, thereby reducing the pressure difference between the disk-side region 2 and the device-side region 3, and thus reducing the vibration of the arm 14 and the entry of particles into the disk-side region 2.

Second Embodiment

The second embodiment will be described below. The same names and reference numerals are given to the same components as those of the t above embodiment, and the overlapping contents are omitted. The following description will be focused on the parts of the present embodiment different from those of the above embodiment.

Figure 6:
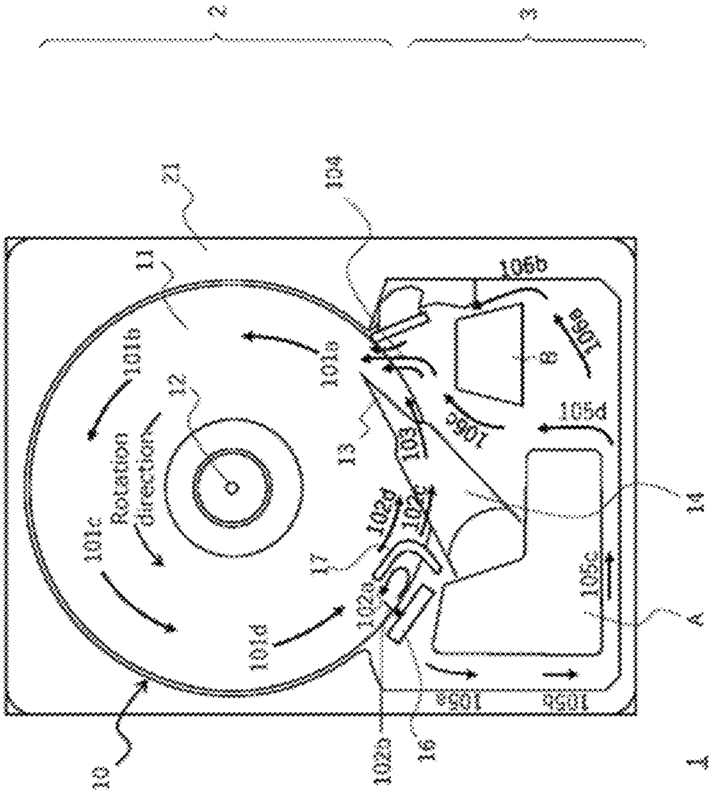
FIG. 6 is a schematic diagram showing the inside of a magnetic disk device according to a second embodiment.

FIG. 6 is a schematic diagram of the inside of the magnetic disk device 1 according to the present embodiment. The present embodiment is different from the first embodiment in that the guide vane 15 is not provided and the collection member 16 is provided. The collection member 16 is provided in a region between a downstream end of the guide vane 15 with respect to the flow between the disks 11 induced by the rotation of the disks 11 and a portion of the damper 17 intersecting with the flow. The collecting member 16 is a filter-like member capable of collecting fine particles such as dust carried on the flow 102*b* in the figure guided by the damper 17. A filter having a structure capable of collecting particles other than the particles carried by the flow from the disk-side region 2 to the device-side region 3, such as the flow 102*b*, may be employed, or the collecting member 16 may be disposed so as to collect these particles. For example, the collecting member 16 may be capable of collecting the fine particles carried by the flow from the device-side region 3 toward the disk-side region 2.

The gas flow generated inside the magnetic disk device 1 will be described below. The thick arrows in the drawing indicate the direction of the gas flow in the magnetic disk device 1. The position and shape of the thick arrow are drawn for convenience of description, and the length and thickness of the thick arrow do not quantitatively indicate the flow velocity or flow rate of the gas flow. The rotation of the disk 11 induces a gas flow, and the flow 101*a* to 101*d* is generated near the front face of the disk 11. In the present specification, the flows 101*a* to 101*d* may be collectively referred to as the flow 101.

The flow 101*d* is decelerated by the damper 17. When a part of the flow 101*d* is blocked by the damper 17, the flow 102*a* circulating inside the damper 17 is generated. A part of the flow 102*a* is divided into the flow 102*b* toward the collecting member 16 and the flow 102*c* flowing to the downstream side of the damper 17. The particles carried by the flow 102*b* are collected by the filter provided in the collecting member 16. The flow 102*c* is decelerated by the damper 17 more than the flow 101*d*.

A part of the flow 101*d* that is not blocked by the damper 17 is rectified by the second portion 172 of the damper 17 to become the flow 102*d*. Since the flow 102*d* is rectified by the damper 17, the flow along the rotation direction of the disk 11 becomes less turbulent.

The flow 103 is downstream of the flow 102*c* and the flow 102*d*. Since the flow 102*c* is a flow decelerated by the damper 17 and the flow 102*d* is a flow rectified by the damper 17, the flow 103 is a flow decelerated with less turbulence. Since the flow 103 is less disturbed, it is possible to prevent particles in the vicinity of the outer edge of the disk-side region 2 from being caught. In addition, the flow 103 is decelerated, and thus the pressure in the region of the disk-side region 2 close to the device-side region 3 increases, and the pressure difference between the disk-side region 2 and the device-side region 3 is reduced. Therefore, the flow 104 from the device-side region 3 toward the disk side region 2 induced by the pressure difference can be reduced, and the flow containing particles can be prevented from flowing into the disk-side region 2.

When the flow 102*b* passes through the collecting member 16, the flow becomes a gas flow flowing between the devices in the device-side region 3. According to the example shown in FIG. 6, the gas flow flows so as to surround the devices A including the actuator and the like. This flow is referred to as a flow 105*a* to 105*d*. In the device-side region 3, there is also a gas flow that surrounds a device B that is different from the device A. This flow is referred to as a flow 106*a* to 106*c*.

The flow 104 includes the downstream flows such as the flows 106*b* to 106*c*, passes through the device-side region 3, and flows into the disk-side region 2 again. The flows 108*a* to 108*b* are flows of the flow 103*a* toward the disk-side region 2.

As described above, in the present embodiment, as in the first embodiment, the damper 17 decelerates the flow and reduces turbulence, thereby reducing the forces applied to the arms 14 and the magnetic heads 13 from the flows 102*c*, 102*d*, and 103 and the vibrations caused by the flows. As a result, the vibration of the arm 14 due to the flow is reduced, and thus the positioning accuracy of the magnetic head 13 by the actuator can be improved, or the positioning can be easily performed. In addition, in the related art, there is a problem in that the flow that has passed through the device-side region 3 flows into the disk-side region 2 again while carrying particles having a particle diameter of approximately several tens nm to several hundreds nm that are present in the device-side region 3. However, according to the present embodiment, since a part of the flow circulates inside the damper 17 and a flow toward the collecting member 16 is formed, it is possible to reduce the vibration of the arm 14 and to reduce the entry of particles into the disk-side region 2.

The magnetic disk device having the above-described configuration can be a magnetic disk device that can reduce the amount of particles adhering to the disk while suppressing the force and vibration applied to the arm due to the flow, and can prevent the disk surface from being damaged and data read/write errors from occurring.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. For example, the damper 17 may be any damper as long as it can decelerate or straighten the flow, and the shape of the damper is not limited to the damper shape shown in the first and second embodiments. These embodiments and modifications thereof are included in the scope and spirit of the invention and are also included in the invention described in the claims and the scope of equivalents thereof.

The invention of the embodiment will be described below.

<1>

A magnetic disk device including:

a rotary shaft configured to rotate a plurality of disks, a shroud that surrounds at least a portion of the disk along an outer edge of the disk with a gap between the shroud and the outer edge of the disk; and a damper that is provided on a downstream side of the shroud with respect to a flow between the disks induced by rotation of the disks, and has a portion intersecting the flow and a portion along the flow.

<2>

The magnetic disk device according to <1>, wherein when a portion of the damper intersecting the flow is defined as a first portion, and a portion of the damper facing from a downstream side to an upstream side of the flow is defined as a second portion, the first portion and the second portion are connected in a curved manner.

<3>

The magnetic disk device according to <1> or <2>, wherein a guide vane is provided along the disk between the damper and an end of the shroud on a downstream side of a flow between the disk and the shroud induced by rotation of the disk one end of the guide vane is connected to the end of the shroud.

<4>

The magnetic disk device according to any one of <1> to <3>, wherein a collection member is provided in a region between a downstream end of the shroud with respect to the flow and a portion of the damper intersecting the flow.

<5>

The magnetic disk device according to any one of <1> to <4>, wherein a magnetic head configured to read data recorded on the disk and write data to the disk, an arm having the magnetic head at a tip end thereof, an actuator configured to perform position control of the head, wherein the casing includes the rotary shaft, the disk, the shroud, the guide vane, the damper, the magnetic head, the arm, and the actuator therein.

The invention claimed is:

1. A magnetic disk device comprising:

a rotary shaft configured to rotate a plurality of disks, a shroud that surrounds at least a portion of the disk along an outer edge of the disk with a gap between the shroud and the outer edge of the disk; and a damper that is fixed to the device and provided on a downstream side of the shroud with respect to a flow between the disks induced by rotation of the disks, and has a portion intersecting the flow and a portion along the flow, wherein the damper is a one-piece damper having a first arm portion and a second arm portion, the first arm portion is a portion of the damper intersecting the flow, and the second arm portion is a portion of the damper facing from a downstream side to an upstream side of the flow, wherein the first arm portion and the second arm portion are connected by a portion of the damper having a curved shape.

2. The magnetic disk device according to claim 1, wherein a guide vane is provided along a disk between the damper and an end of the shroud on a downstream side of a flow between the disk and the shroud induced by rotation of the disk one end of the guide vane is connected to the end of the shroud.

3. The magnetic disk device according to claim 1, wherein a collection member is provided in a region between a downstream end of the shroud with respect to the flow and a portion of the damper intersecting the flow.

4. The magnetic disk device according to claim 1, wherein a magnetic head configured to read data recorded on the disk and write data to the disk, an arm having the magnetic head at a tip end thereof, an actuator configured to perform position control of the head, wherein a casing includes the rotary shaft, the disk, the shroud, a guide vane, the damper, the magnetic head, the arm, and the actuator therein.

5. The magnetic disk device according to claim 1, wherein
a magnetic head configured to read data recorded on a disk and write data to the disk,
an arm having the magnetic head at a tip end thereof,
an actuator configured to perform position control of the head, wherein
a casing includes the rotary shaft, the disk, the shroud, a guide vane, the damper, the magnetic head, the arm, and the actuator therein.

6. The magnetic disk device according to claim 2, wherein
a magnetic head configured to read data recorded on the disk and write data to the disk,
an arm having the magnetic head at a tip end thereof,
an actuator configured to perform position control of the head, wherein
a casing includes the rotary shaft, the disk, the shroud, the guide vane, the damper, the magnetic head, the arm, and the actuator therein.

7. The magnetic disk device according to claim 3, wherein
a magnetic head configured to read data recorded on the disk and write data to the disk,
an arm having the magnetic head at a tip end thereof,
an actuator configured to perform position control of the head, wherein
a casing includes the rotary shaft, the disk, the shroud, a guide vane, the damper, the magnetic head, the arm, and the actuator therein.

8. The magnetic disk device according to claim 1, wherein the damper is inserted between the disks.

* * * * *